United States Patent
Mochizuki

(10) Patent No.: US 12,462,598 B2
(45) Date of Patent: Nov. 4, 2025

(54) DETECTION DEVICE AND DISPLAY DEVICE

(71) Applicant: Magnolia White Corporation, Tokyo (JP)

(72) Inventor: Kazuhide Mochizuki, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 434 days.

(21) Appl. No.: 17/989,026

(22) Filed: Nov. 17, 2022

(65) Prior Publication Data

US 2023/0078687 A1   Mar. 16, 2023

Related U.S. Application Data

(63) Continuation of application No. PCT/JP2021/015509, filed on Apr. 14, 2021.

(30) Foreign Application Priority Data

May 21, 2020   (JP) .................. 2020-089227

(51) Int. Cl.
G06V 40/13   (2022.01)
H10K 59/60   (2023.01)
H10K 59/65   (2023.01)

(52) U.S. Cl.
CPC ......... G06V 40/1318 (2022.01); H10K 59/60 (2023.02); H10K 59/65 (2023.02)

(58) Field of Classification Search
None
See application file for complete search history.

(56) References Cited

U.S. PATENT DOCUMENTS

| 10,388,689 B2* | 8/2019 | Huang ............... G06V 40/1318 |
| 10,680,121 B2 | 6/2020 | Huang et al. |
| 2013/0314377 A1* | 11/2013 | Los ..................... G06F 3/03547 |
| | | 345/175 |

(Continued)

FOREIGN PATENT DOCUMENTS

| JP | 2019-003650 A | 1/2019 |
| JP | 2019-512762 A | 5/2019 |
| WO | WO2019/097795 A1 | 5/2019 |

OTHER PUBLICATIONS

International Search Report issued in International Patent Application No. PCT/JP2021/015509 on May 25, 2021 and English translation of same. 5 pages.

(Continued)

*Primary Examiner* — Nilufa Rahim
(74) *Attorney, Agent, or Firm* — K&L Gates LLP

(57) ABSTRACT

According to an aspect, a detection device includes: a plurality of optical sensors arranged in a matrix having a row-column configuration; and an optical filter provided facing a surface for detecting light with the optical sensors. The optical filter includes a base configured not to transmit light and a plurality of apertures provided in the base and configured to transmit light. An arrangement of the apertures in the base comprises an arrangement in which the apertures are arranged spirally outward clockwise from a predetermined area and arrangement in which the apertures are arranged spirally outward counterclockwise from the predetermined area. The predetermined area contains a predetermined point.

14 Claims, 14 Drawing Sheets

(56) References Cited

U.S. PATENT DOCUMENTS

| | | | |
|---|---|---|---|
| 2016/0254312 A1* | 9/2016 | Lee | G02B 27/30 |
| | | | 382/125 |
| 2017/0062638 A1* | 3/2017 | Oddoye | H10F 55/00 |
| 2018/0366593 A1* | 12/2018 | Huang | H10K 59/65 |
| 2019/0050621 A1* | 2/2019 | Xu | G06V 40/1318 |
| 2021/0004557 A1* | 1/2021 | Tordera Salvador | |
| | | | B29D 11/00634 |
| 2022/0301337 A1* | 9/2022 | Huang | H10F 39/8057 |
| 2023/0096025 A1* | 3/2023 | Li | H10F 39/8057 |
| | | | 382/124 |

OTHER PUBLICATIONS

Written Opinion issued in International Patent Application No. PCT/JP2021/015509 on May 25, 2021. 3 pages.

* cited by examiner

| | | ROTATION ANGLE | | | |
|---|---|---|---|---|---|
| | | 0 DEGREES | 15 DEGREES | 30 DEGREES | 45 DEGREES |
| APERTURE PITCH | 50 μm | | | | |
| | 40 μm | | | | |
| | 30 μm | | | | |
| | 25 μm | | | | |

DETECTION DEVICE AND DISPLAY DEVICE

CROSS-REFERENCE TO RELATED APPLICATION

This application claims the benefit of priority from Japanese Patent Application No. 2020-089227 filed on May 21, 2020 and International Patent Application No. PCT/JP2021/015509 filed on Apr. 14, 2021, the entire contents of which are incorporated herein by reference.

BACKGROUND

1. Technical Field

What is disclosed herein relates to a detection device and a display device.

2. Description of the Related Art

In detection devices having a plurality of optical sensors arranged for detecting a planar object to be detected such as a fingerprint, a configuration is known in which an optical filter is provided between the optical sensors and the object to be detected (Japanese Patent Application Laid-open Publication No. 2019-003650, for example).

The optical filter is provided with a plurality of apertures that transmit light traveling from the object to be detected toward the optical sensors. In this configuration, depending on the relation between the arrangement direction of the optical sensors and the alignment direction of the apertures, moiré may occur in a detection image obtained by integrating the detection results of the respective optical sensors. Therefore, if an unintended misalignment occurs in the relation between the arrangement direction of the optical sensors and the alignment direction of the apertures in the manufacturing process of the detection device and/or other processes, unintended moiré occurs. In conventional detection devices, sufficient measures have not been taken against such unintended moiré.

For the foregoing reasons, there is a need for a detection device and a display device capable of more reliably reduce the unintended moiré.

SUMMARY

According to an aspect, a detection device includes: a plurality of optical sensors arranged in a matrix having a row-column configuration; and an optical filter provided facing a surface for detecting light with the optical sensors. The optical filter includes a base configured not to transmit light and a plurality of apertures provided in the base and configured to transmit light. An arrangement of the apertures in the base comprises an arrangement in which the apertures are arranged spirally outward clockwise from a predetermined area and arrangement in which the apertures are arranged spirally outward counterclockwise from the predetermined area. The predetermined area includes a predetermined point.

DETAILED DESCRIPTION

Figure 1:
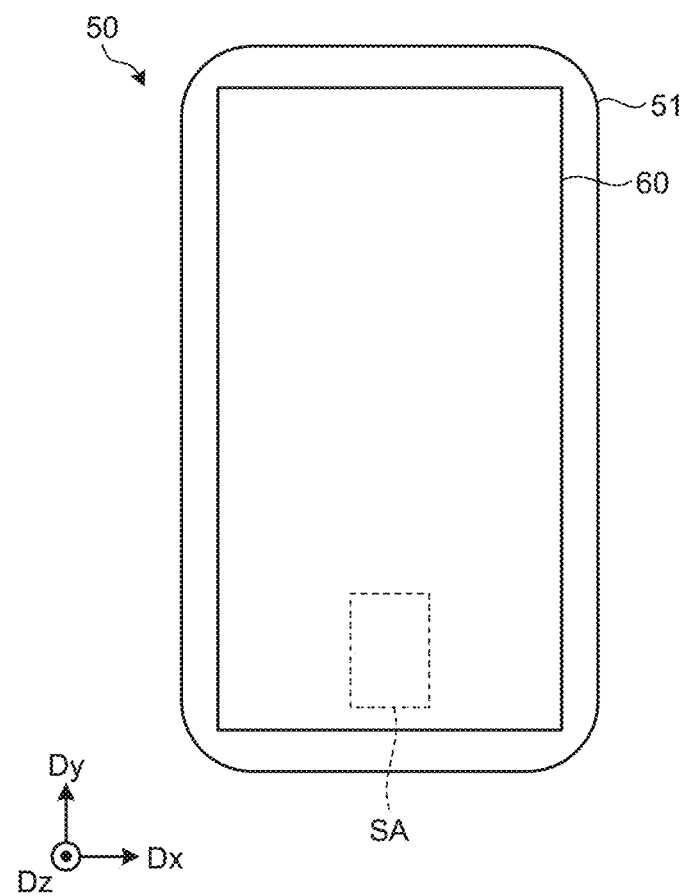
FIG. 1 is a schematic view of an electronic apparatus including a detection device according to an embodiment.

The following describes a mode (embodiment) for carrying out the present disclosure with reference to the drawings. What is disclosed herein is merely an example, and the present invention naturally encompasses appropriate modifications easily conceivable by those skilled in the art while maintaining the gist of the invention. To further clarify the description, the drawings may schematically illustrate, for example, widths, thicknesses, and shapes of various parts as compared with actual aspects thereof. However, they are merely examples, and interpretation of the present invention is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

FIG. 1 is a schematic view of an electronic apparatus 50 including a detection device 90 (refer to FIG. 2) according to an embodiment. The electronic apparatus 50 is an electronic apparatus that serves as an information processing device such as a smartphone. Although not illustrated in the drawings, arithmetic circuitry to serve as the information processing device is provided in a housing 51.

The electronic apparatus 50 includes a display part 60. The display part 60 displays an image. The display part 60 includes a detection area SA in a display area of the image. The size and the position of the detection area SA in the display part 60 are not limited to those illustrated in FIG. 1. For example, the entire display part 60 may serve as the detection area SA. The display part 60 may include a plurality of the detection areas SA.

In the description of the embodiment, one of two mutually orthogonal directions is referred to as a first direction Dx and the other as a second direction Dy. The first and the second directions Dx and Dy are along a display surface of the display part 60. A direction orthogonal to the first and the second directions Dx and Dy is referred to as a third direction Dz.

Figure 2:
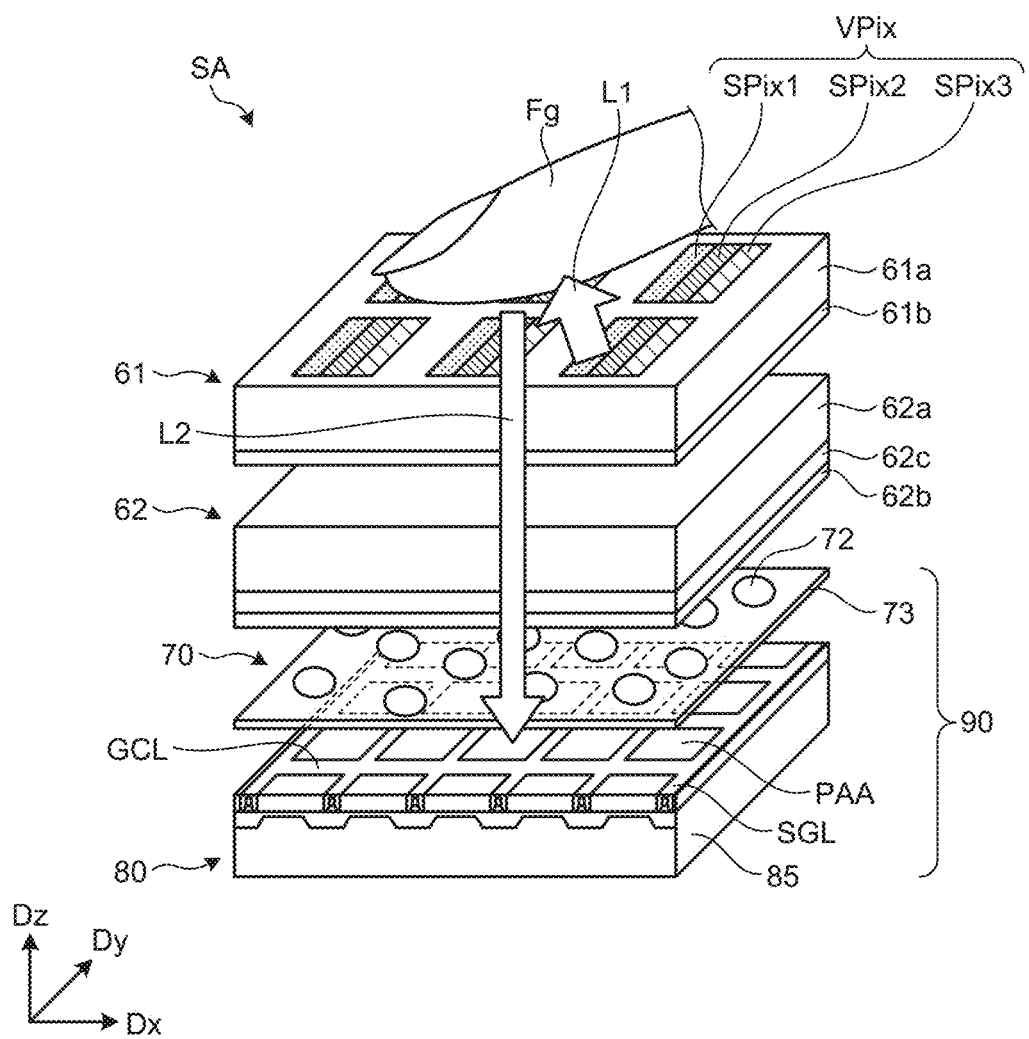
FIG. 2 is a schematic view illustrating a main configuration example of a multilayered structure in a detection area.

FIG. 2 is a schematic view illustrating a main configuration example of a multilayered structure in the detection area SA. The detection area SA is provided with a display part 61, an infrared cutoff filter 62, an optical filter 70, and a sensor 80. These components are stacked in the third direction Dz, as illustrated in FIG. 2. The detection device 90 of the embodiment includes at least the optical filter 70 and the sensor 80.

The display part 61 includes at least a self-luminous display panel 61a, such as an organic light-emitting diode (OLED) display. That is, the display panel 61a has a function to emit visible light. Specifically, the display panel 61a includes a plurality of pixels VPix. The pixels VPix are arranged in a matrix having a row-column configuration along the first and the second directions Dx and Dy, for example. The arrangement of the pixels VPix is not limited thereto. The pixels VPix may be arranged in a staggered manner, for example, or may be arranged in another manner.

Each of the pixels VPix includes a plurality of sub-pixels, for example, first sub-pixels SPix1, second sub-pixels SPix2, and third sub-pixels SPix3. The first sub-pixels SPix1, the second sub-pixels SPix2, and the third sub-pixels SPix3 emit the visible light in different colors of, for example, red, blue, and green. The light emitted from each of the sub-pixels is light emitted from an organic light-emitting layer (not illustrated) provided in the display panel 61a.

Although not illustrated in the drawings, the display panel 61a includes a gas barrier layer provided on the infrared cutoff filter 62 side with respect to the organic light-emitting layer. The gas barrier layer further enhances the stability of the organic light-emitting layer. The gas barrier layer in the detection area SA is a light-transmitting gas barrier layer that transmits at least part of the visible light emitted by the organic light-emitting layer. The light-transmitting gas barrier layer is a thin film layer formed using a synthetic resin such as polyethylene terephthalate (PET). The specific composition of the light-transmitting gas barrier layer is not limited thereto, and may be made using another synthetic resin or a light-transmitting material other than synthetic resins.

The remaining portion of the display part 60 that is not the detection area SA is provided with a non-light transmissive gas barrier layer as a gas barrier layer that does not transmit the light emitted by the organic light-emitting layer. The non-light transmissive gas barrier layer is a thin film layer formed using an oxide of a metal, for example. Examples usable as such a metal include silicon (Si), aluminum (Al), zinc (Zn), and tin (Sn), but are not limited to these metals. Such a metal only needs to be a metal that can form an oxide capable of serving as a non-light transmissive gas barrier layer.

Light L1 emitted from each of the sub-pixels is emitted toward the display surface. The display surface side is located opposite to the infrared cutoff filter 62 side of the display panel 61a. In this configuration, when an object to be detected such as a finger Fg is present on the display surface side of the display panel 61a in the detection area SA, at least part of the light L1 is transmitted through the display panel 61a as light L2 reflected by the object to be detected, and travels toward the infrared cutoff filter 62.

An adhesive layer 61b is provided on the infrared cutoff filter 62 side of the display panel 61a. The display part 61 and the infrared cutoff filter 62 are bonded and stacked together with the adhesive layer 61b interposed therebetween.

The infrared cutoff filter 62 includes, for example, a glass substrate 62a, an adhesive layer 62b, and an interference layer 62c. The glass substrate 62a is a light-transmitting substrate bonded to the display panel 61a with the adhesive layer 61b interposed therebetween. The adhesive layer 62b is provided on the optical filter 70 side of the infrared cutoff filter 62. The infrared cutoff filter 62 and the optical filter 70 are bonded and stacked together with the adhesive layer 62b interposed therebetween. The interference layer 62c is provided between the glass substrate 62a and the adhesive layer 62b. The interference layer 62c is formed of, for example, a thin film provided to reflect, toward the display surface side, infrared light of the light L2 incident from the display surface side and infrared light of light from outside. The interference layer 62c reduces a rise in temperature of the sensor 80 that would be caused by the incident infrared light. Specifically, the thin film includes a thin film layer of silver (Ag), for example. The thin film including the thin film layer transmits at least part of the visible light such as the light L2. The specific configuration of the interference layer 62c is not limited to the above-described configuration and may be another configuration that functions in the same manner.

The optical filter 70 is an optical element that transmits the light L2 along the third direction Dz, and reduces stray light except that in the third direction Dz. Specifically, the optical filter 70 includes a base 73 and a plurality of apertures 72. The base 73 serves as a light-blocking member that does not transmit light. This configuration reduces crosstalk between partial detection areas PAA adjacent to each other in the partial detection areas PAA described later.

The apertures 72 are arranged along a first direction Dx-second direction Dy plane of the base 73. Each of the apertures 72 is a hole passing through the base 73 in the third direction Dz, for example. The diameter of the aperture 72 is 15 [μm], for example, but is not limited thereto, and can be changed as appropriate. The aperture 72 is also called, for example, a collimating aperture or a collimator. The aperture 72 may be a cylindrical through-hole formed in the base 73 such that the inner peripheral surface thereof extends along the third direction Dz. In this case, the length of the inner peripheral surface in the third direction Dz is such an extent that, among light radially emitted radially from a certain point on the infrared cutoff filter 62 side toward the sensor 80 side and entering the aperture 72, light traveling in the third direction Dz and substantially in the third direction Dz reaches the sensor 80 side. In other words, the length of the inner peripheral surface in the third direction Dz is long enough that light in directions intersecting the third direction Dz is blocked by the inner peripheral surface. The hole may be filled with a light-transmitting material. In this case, the shape of the inner peripheral surface of the hole is, for example, a shape widened from the infrared cutoff filter 62 side toward the sensor 80.

The sensor 80 is provided with the partial detection areas PAA. The partial detection areas PAA are arranged in a matrix having a row-column configuration along the first direction Dx and the second direction Dy. In the embodiment, the direction of the matrix-shaped arrangement of the pixels VPix and the direction of the matrix-shaped arrangement of the partial detection areas PAA are the same each other, but may be different from each other.

Figure 3:
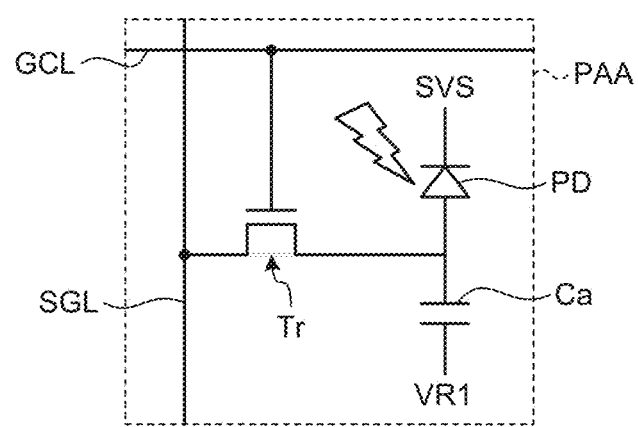
FIG. 3 is a diagram illustrating a circuit configuration example of a partial detection area.

FIG. 3 is a diagram illustrating a circuit configuration example of each of the partial detection areas PAA. As illustrated in FIG. 3, the partial detection area PAA includes a photodiode PD, a capacitive element Ca, and a switching element Tr. The switching element Tr is provided corresponding to the photodiode PD. The switching element Tr is formed with a thin-film transistor, and in this example, formed with an n-channel metal oxide semiconductor (MOS) thin-film transistor (TFT). The gate of the switching element Tr is coupled to a gate line GCL. The source of the switching element Tr is coupled to a signal line SGL. The drain of the switching element Tr is coupled to the anode of the photodiode PD and the capacitive element Ca.

Figure 16:
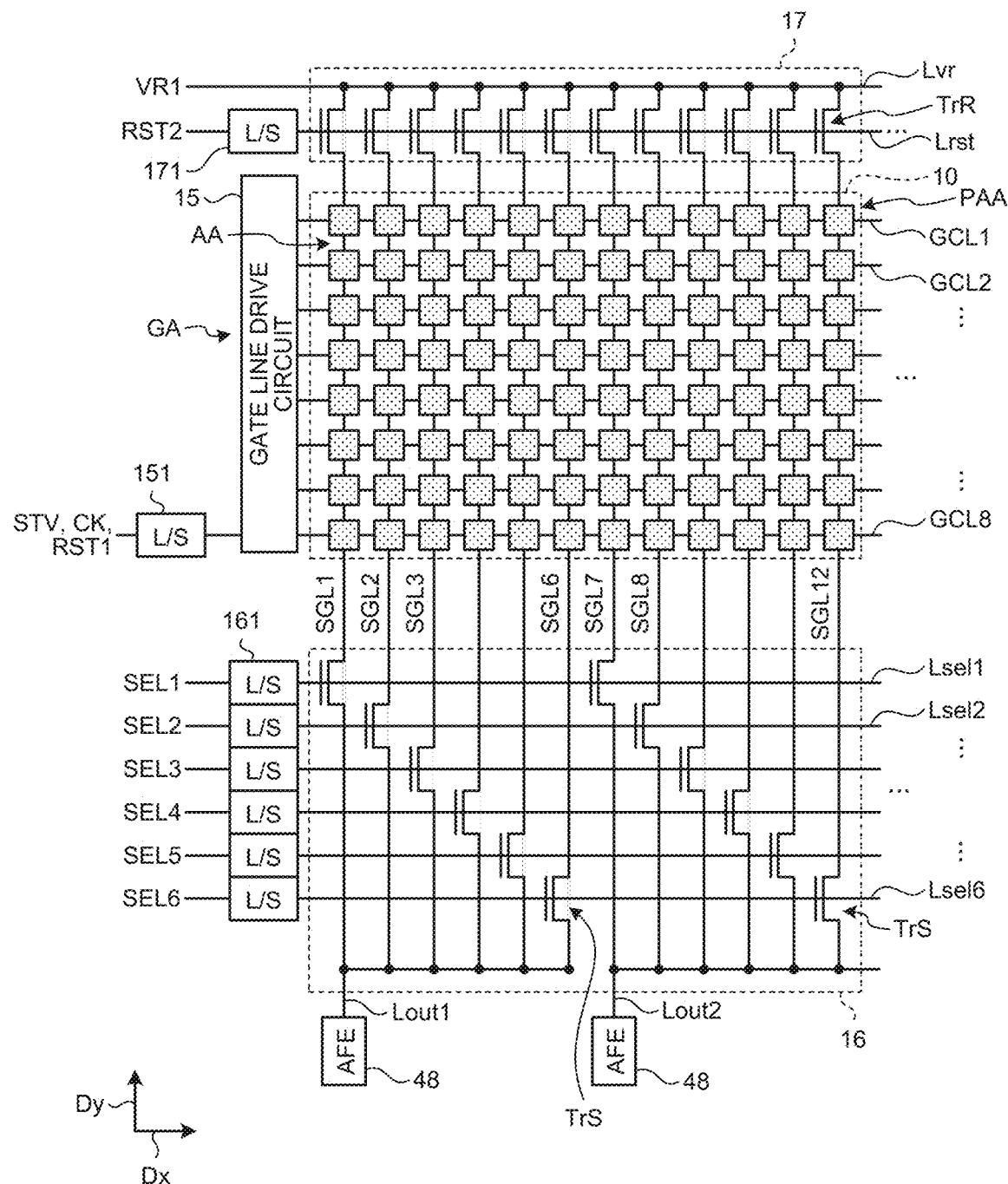
FIG. 16 is a circuit diagram illustrating the detection device according to the modification.

The cathode of the photodiode PD is supplied with a power supply signal SVS. The capacitive element Ca is supplied with a reference signal VR1 that serves as an initial potential of the capacitive element Ca. The configuration for supplying the power supply signal (voltage) SVS and the reference signal (voltage) VR1 may be the same as that of a power supply circuit 103 (refer to FIG. 14) in a modification described later, or may be a dedicated configuration (not illustrated) provided in the embodiment. As illustrated in FIG. 16, the gate line GCL extends in the first direction Dx, and is coupled to the partial detection areas PAA arranged in the first direction Dx. The signal line SGL extends in the second direction Dy and is coupled to the partial detection areas PAA arranged in the second direction Dy.

When the partial detection area PAA is irradiated with light, a current corresponding to the amount of the light flows through the photodiode PD. As a result, an electric charge is stored in the capacitive element Ca. After the switching element Tr is turned on in response to a drive signal transmitted through the gate line GCL, a current corresponding to the electric charge stored in the capacitive element Ca flows through the signal line SGL. The current flowing through the signal line SGL allows the sensor 80 to detect a signal corresponding to the amount of the light irradiating the photodiode PD in each of the partial detection areas PAA. The configuration for supplying the drive signal to the gate line GCL may be the same as that of a gate line drive circuit 15 (refer to FIG. 14) in the modification described later, or may be a dedicated configuration (not illustrated) provided in the embodiment.

The photodiodes PD individually provided in the partial detection areas PAA arranged in a matrix in the embodiment, are microphotodiodes arranged in a matrix at a predetermined pitch in the first direction Dx and the second direction Dy. The predetermined pitch is 50 [μm], for example. The predetermined pitch is set on the assumption that the fingerprint of the finger Fg is detected, but is not limited to this pitch. The predetermined pitch is set as appropriate so as to correspond to the main object to be detected.

A substrate 85 illustrated in FIG. 2 is a substrate on which the various components illustrated in FIG. 3 are mounted. The substrate 85 is a non-light transmissive substrate. That is, a light detection surface formed by the partial detection areas PAA faces the optical filter 70 side. The light detection surface is along the first direction Dx-second direction Dy plane in which the partial detection areas PAA are provided in a matrix.

A flow of fingerprint detection of the finger Fg will be described based on FIG. 2. While the finger Fg is located in the detection area SA such that the fingerprint faces the display part 61, the light L1 is emitted from each of the sub-pixels constituting pixels VPix of the display part 61. Part of the light L1 passes through the display part 61 as the light L2 reflected by the finger Fg and travels toward the infrared cutoff filter 62. The light L2 passes through the infrared cutoff filter 62 and travels toward the optical filter 70. Part of the light L2 transmitted through the infrared cutoff filter 62 and traveling along the third direction Dz passes through the apertures 72 and is detected by the photodiodes PD. The pattern of the light detected by the photodiodes PD individually included in the partial detection areas PAA corresponds to the pattern of the fingerprint. The electric charges stored in the capacitive elements Ca and the currents that flow through the signal lines SGL are dependent on the pattern of the detected light. In the embodiment, a configuration is provided that performs various types of processing to generate a two-dimensional image based on such currents. The configuration outputs the two-dimensional image as a detection image of the fingerprint. In this manner, the fingerprint detection is performed based on the output of the sensor 80. The configuration may be, for example, the same as that of a detector (detection processing circuit) 40 in the modification described later, or may be a dedicated configuration (not illustrated) provided in the embodiment.

If light unnecessary for the detection, such as diffused light or stray light, is detected by the photodiode PD, unintended crosstalk may occur. Such crosstalk can cause blurring in the detection image. In the embodiment, such crosstalk can be restrained from occurring by limiting the light detected in the partial detection areas PAA to the light transmitted through the apertures 72. That is, according to the embodiment, it is possible to well reduce the blurring of the detection image caused by the crosstalk.

Figure 4:
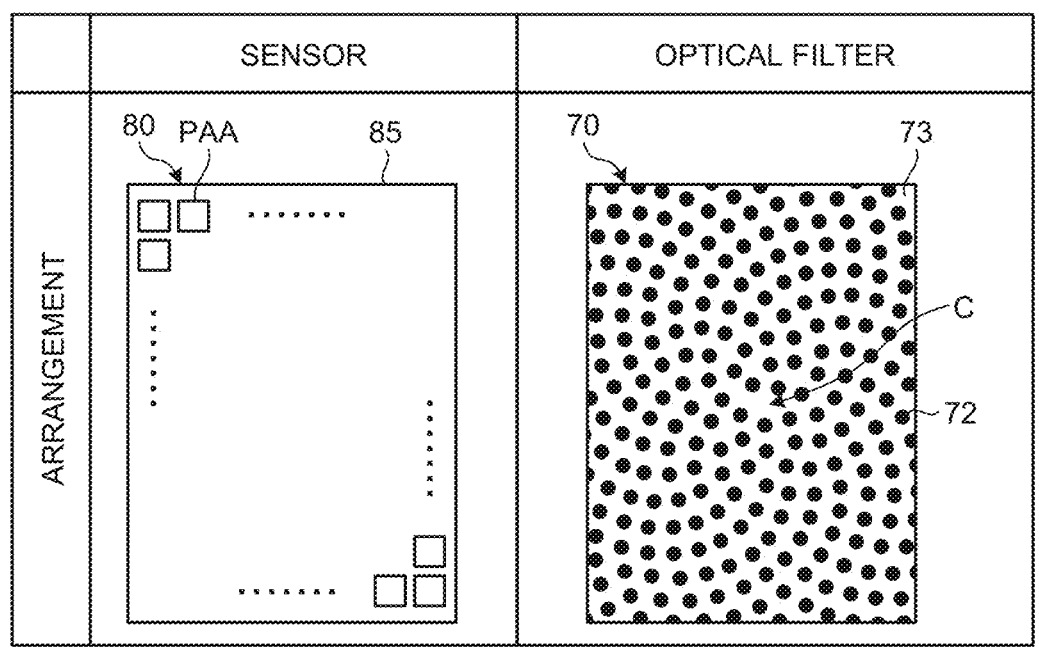
FIG. 4 illustrates schematic views illustrating an exemplary relation between an arrangement of a plurality of optical sensors and an arrangement of a plurality of apertures in first direction Dx-second direction Dy plan views.
Figure 5:
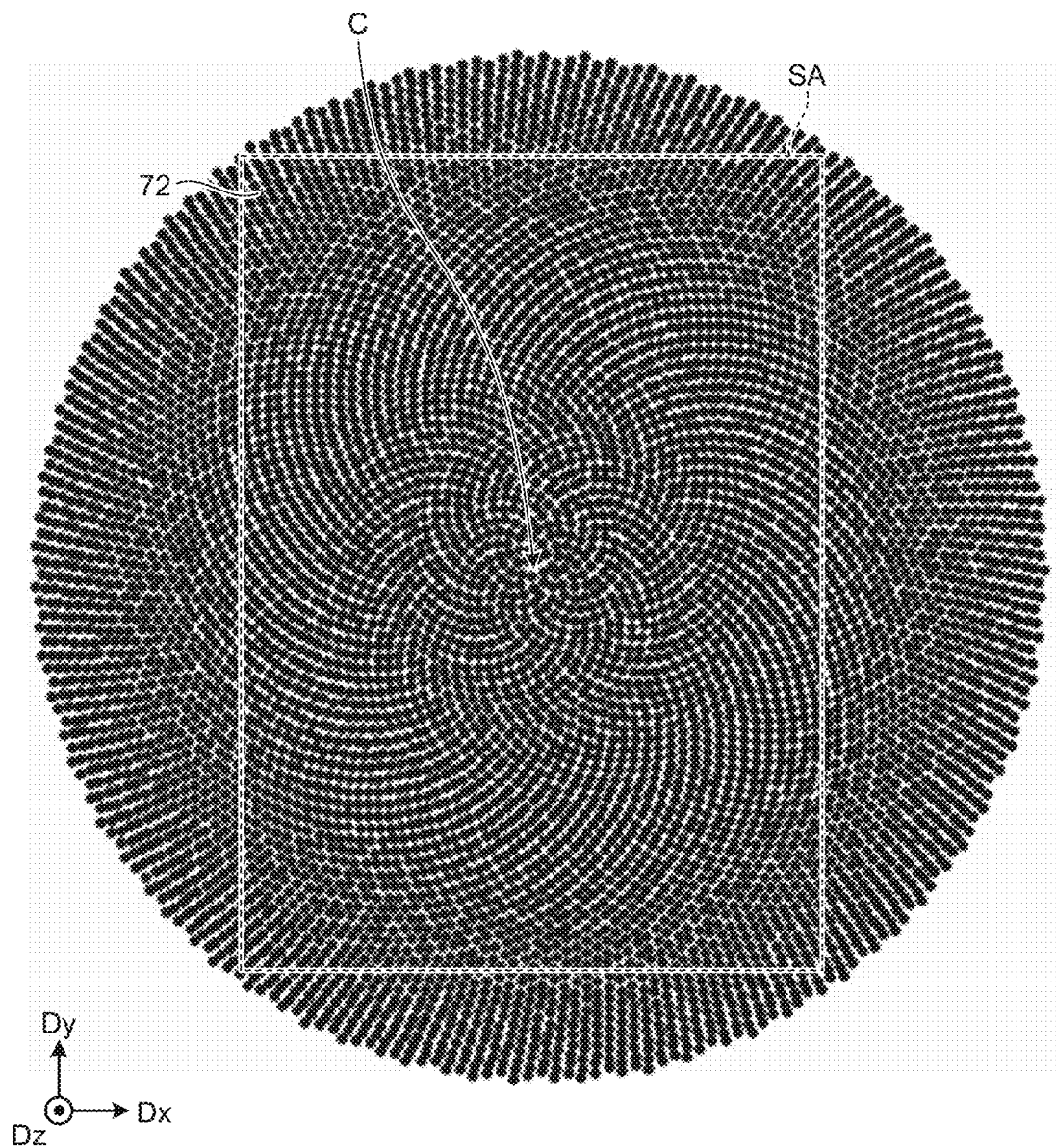
FIG. 5 is a schematic view illustrating an arrangement example of the apertures in the detection area.
Figure 6:
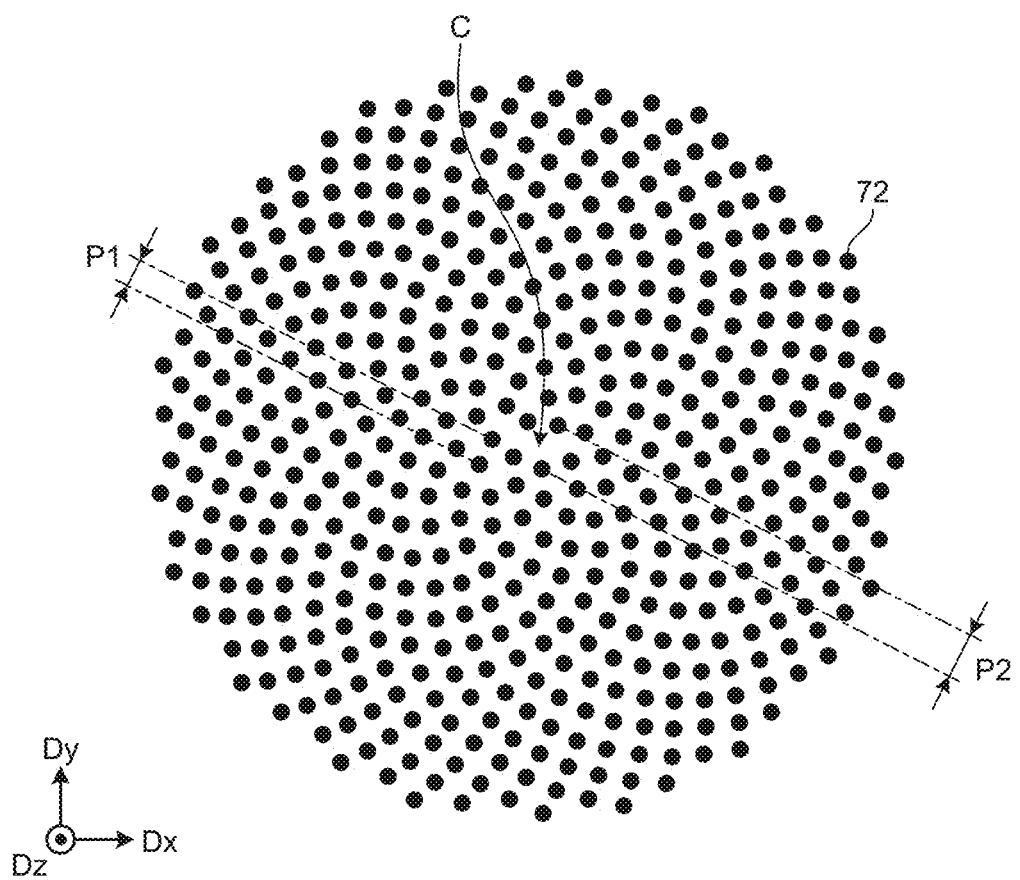
FIG. 6 is a magnified view near a center point in FIG. 5.
Figure 7:
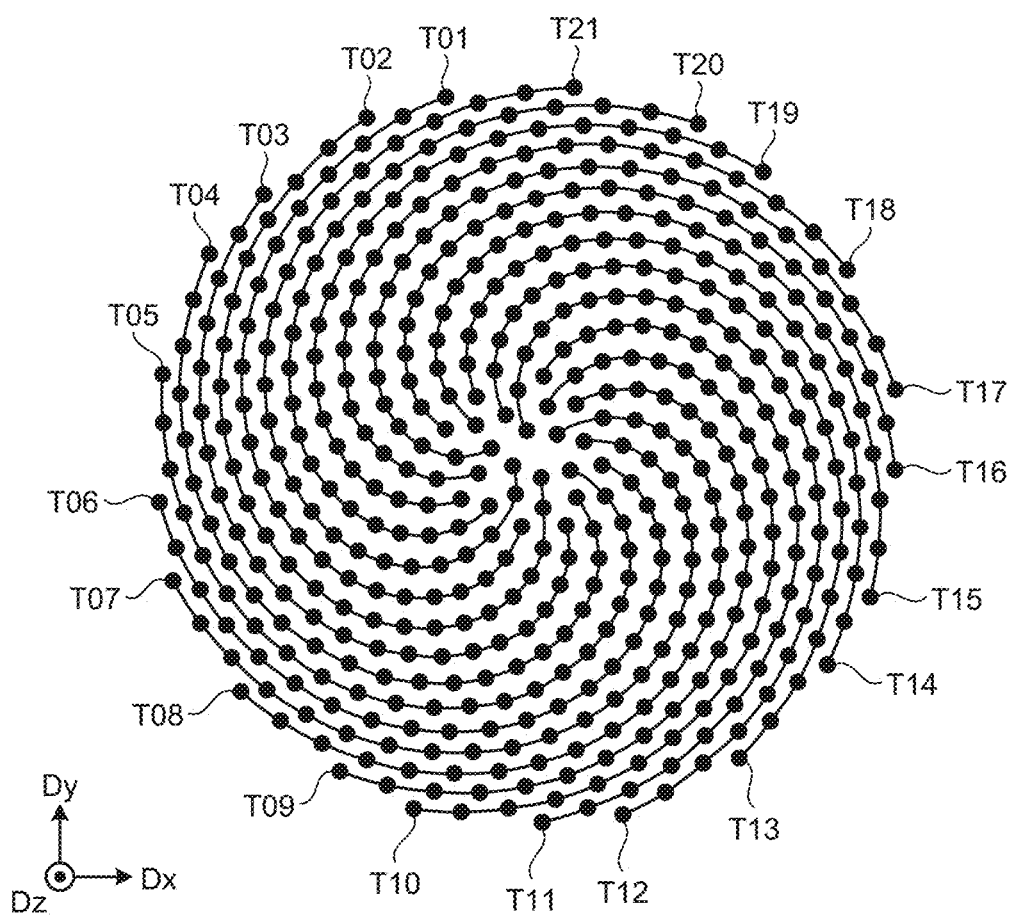
FIG. 7 is a view illustrating lines connecting together the apertures that are arranged spirally outward clockwise from an area including the center point in FIG. 6.
Figure 8:
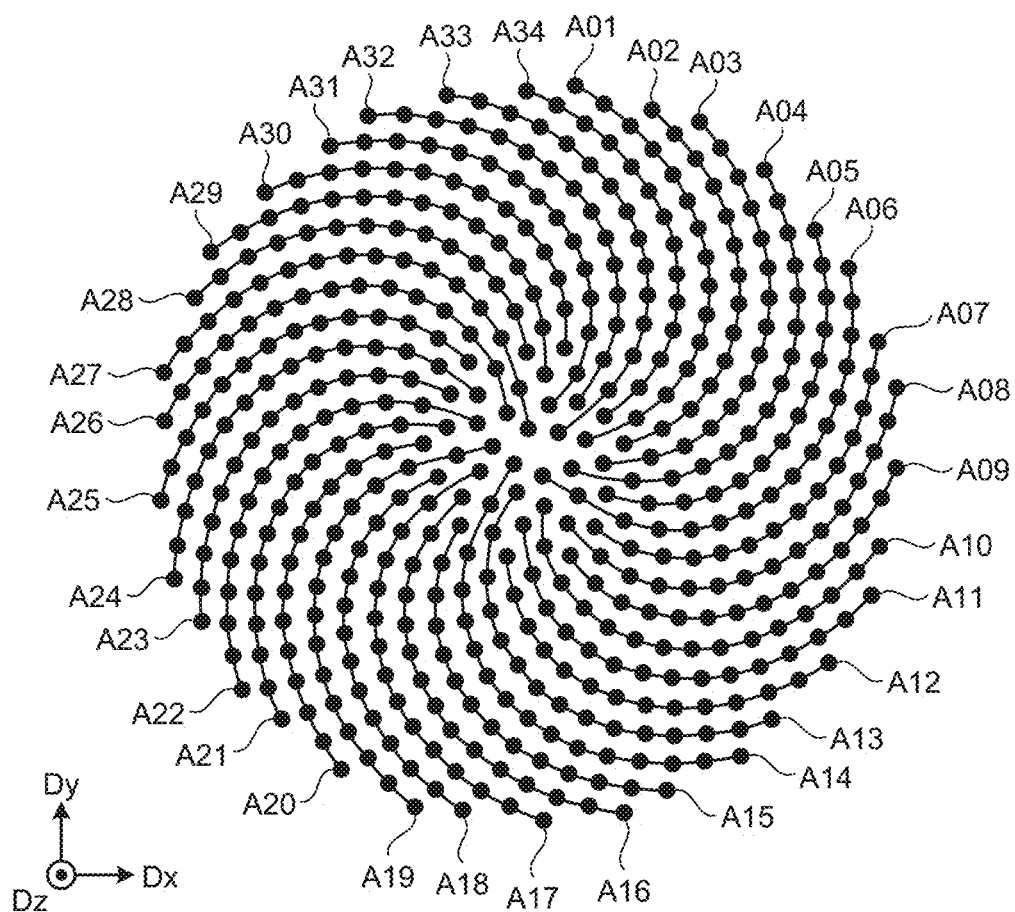
FIG. 8 is a view illustrating lines connecting together the apertures that are arranged spirally outward counterclockwise from the area including the center point in FIG. 6.

The following describes a relation between the arrangement of the partial detection areas PAA and the arrangement of the apertures 72 with reference to FIGS. 4 to 8. FIG. 4 illustrates schematic views illustrating an exemplary relation between the arrangement of the partial detection areas PAA and the arrangement of the apertures 72 in the first direction Dx-second direction Dy plan views. FIG. 5 is a schematic view illustrating an arrangement example of the apertures 72 in the detection area SA. FIG. 6 is a magnified view near a center point C in FIG. 5. FIG. 7 is a view illustrating lines T01, T02, . . . , T21 connecting together the apertures 72 that are arranged spirally outward clockwise from a predetermined area including the center point C in FIG. 6. FIG. 8 is a view illustrating lines A01, A02, . . . , A34 connecting together the apertures 72 that are arranged spirally outward counterclockwise from the predetermined area including the center point C in FIG. 6. In this disclosure, the predetermined area is an area including a position of a predetermined point (e.g. the center point C, in this embodiment) and not including any apertures 72. Hereinafter, the predetermined area is referred to as a central area in some cases.

As described above, the arrangement of the partial detection areas PAA is a matrix arrangement. In contrast, the arrangement of the apertures 72 includes the arrangement in which the apertures 72 are arranged spirally outward clockwise from the predetermined area including the center point C (refer to FIGS. 6 and 7) and the arrangement in which the apertures 72 are arranged spirally outward counterclockwise from the predetermined area including the center point C (refer to FIGS. 6 and 8). The center point C that serves as a predetermined point is a point serving as the center of the first direction Dx-second direction Dy plane in the arrangement of the apertures 72. The center point C is set in advance before determining the arrangement of the apertures 72.

The arrangement of the partial detection areas PAA illustrated in FIG. 4 is the arrangement of some of the partial detection areas PAA illustrated in FIG. 6 that are included in a rectangular area corresponding to the detection area SA. In FIG. 4, the positional relation between the arrangement of the partial detection areas PAA in FIG. 6 and the detection area SA in FIG. 4 is set such that the center point C overlaps the center of the detection area SA.

Specifically, the position of each of the apertures 72 can be expressed as coordinates in the xy-coordinate system in the first direction Dx-second direction Dy plane, where the x-coordinate is obtained by Expression (1), and the y-coordinate is obtained by Expression (2). The x-coordinate is a coordinate in the first direction Dx. The y-coordinate is a coordinate in the second direction Dy. The coordinates of the center point C are defined as (x, y)=(0, 0). a in Expressions (1) and (2) is any non-zero constant. t in Expressions (1) and (2) is a parameter. The parameter is a natural number sequentially set from 1 according to the number of the apertures 72 arranged. For example, the coordinates of the first aperture 72 are obtained by substituting 1 for t in Expressions (1) and (2). The coordinates of the second aperture 72 are obtained by substituting 2 for t in Expressions (1) and (2). Thereafter, in the same manner, the coordinates of the m-th aperture 72 are obtained by substituting m for t in Expressions (1) and (2). In this case, m is a natural number equal to or larger than 3. α in Expressions (1) and (2) represents the golden angle. α can be expressed as Expression (3). Solving Expression (3) gives that α=137.507764 . . . [°]. φ in Expressions (1) and (2) represents the golden ratio. φ can be expressed as Expression (4). Solving Expression (4) gives that φ=1.618 . . . (α/180)n in Expressions (1) and (2) represents the golden angle expressed in radians. (α/180)n can be expressed as Expression (5). Solving Expression (5) gives that (α/180)n is approximately 2.4.

$$x = a \cdot t \cdot \cos[(\alpha/180)nt] \quad (1)$$

$$y = a \cdot t \cdot \sin[(\alpha/180)nt] \quad (2)$$

$$\alpha = 360/(1+\varphi) = 360/\varphi^2 \quad (3)$$

$$\varphi = [1+\sqrt{5}]/2 \quad (4)$$

$$(\alpha/180)n = \alpha(n/180) = 2n/\varphi^2 \quad (5)$$

The specific arrangement of the apertures 72 can be determined by performing a calculation to sequentially determine the arrangement of each aperture 72 while gradually increasing the value substituted for t based on Expressions (1) to (5) given above and the predetermined value of "a". The apertures 72 thus determined to be arranged are arranged so as to form a circular area centered at the center point C, as illustrated in FIG. 5. In this case, the apertures 72 arranged at locations determined by substituting smaller values of t are located closer to the center point C. Consequently, the outermost apertures 72 arranged so as to rim the circumference of the circular area illustrated in FIG. 5 are the apertures 72 arranged at locations determined by substituting larger values of t than the apertures 72 arranged more inside. In FIG. 5, one representative black spot is denoted by a reference numeral 72, but in reality, all black spots illustrated in FIG. 5 represent the apertures 72. The detection area SA illustrated in FIG. 1 is rectangular. When the base 73 is provided so as to have a shape corresponding to the detection area SA, the apertures 72 provided in the base 73 are, for example, the apertures 72 in the detection area SA illustrated in FIG. 5. The size and density of the apertures 72 illustrated in FIG. 5 are closer to the actual size and density than those of the apertures 72 illustrated in FIG. 4, but the actual size and density of the apertures 72 are finer than those in FIG. 5.

A pitch P1 denotes the pitch between two of the apertures 72 closest to each other among the apertures 72 illustrated in FIG. 6. In this case, the pitch P1 is equal to or smaller than the predetermined pitch. That is, the pitch P1 is equal to or smaller than the pitch between two of the photodiodes PD adjacent in the first direction Dx. The pitch P1 is equal to or smaller than the pitch between two of the photodiodes PD adjacent in the second direction Dy.

A pitch P2 denotes the pitch between two of the apertures 72 farthest from each other among the apertures 72 illustrated in FIG. 6. In this case, the pitch P2 is equal to or smaller than the predetermined pitch. That is, the pitch P2 is equal to or smaller than the pitch between two of the photodiodes PD adjacent in the first direction Dx. The pitch P2 is equal to or smaller than the pitch between two of the photodiodes PD adjacent in the second direction Dy.

By setting the pitches P1 and P2 equal to or smaller than the predetermined pitch, one or more of the apertures 72 can be more easily arranged for each of the photodiodes PD in the first direction Dx-second direction Dy plan view.

FIG. 7 illustrates line segments T1, T2, . . . , T21 that trace the arrangement of the apertures 72 arranged spirally outward clockwise from the center point C illustrated in FIG. 6 serving as a starting point. The line segments T1, T2, . . . , T21 are arranged in the circumferential direction. That is, the arrangement of the apertures 72 in the optical filter 70 can be said to be an arrangement formed by arranging a first predetermined number of strings of the apertures 72 arranged spirally clockwise in the circumferential direction. In the case of the example illustrated in FIG. 7, the first predetermined number is 21.

FIG. 8 illustrates line segments A1, A2, . . . , A34 that trace the arrangement of the apertures 72 arranged spirally outward counterclockwise from the center point C illustrated in FIG. 6 serving as a starting point. The line segments A1, A2, . . . , A34 are arranged in the circumferential direction. That is, the arrangement of the apertures 72 in the optical filter 70 can be said to be an arrangement formed by arranging a second predetermined number of strings of the apertures 72 arranged spirally counterclockwise in the circumferential direction. In the case of the example illustrated in FIG. 8, the second predetermined number is 34.

In this case, the relation between the first predetermined number and the second predetermined number is a relation between two different consecutive values in the Fibonacci sequence. The Fibonacci sequence is defined by a recurrence formulas $F_0=0$, $F_1=1$, $F_{(n+2)}=F_n+F_{(n+1)}$ (n≥0). The terms of the Fibonacci sequence of $F_0$, $F_1$, $F_2$, . . . , $F_{10}$ are enumerated as 0, 1, 1, 2, 3, 5, 8, 13, 21, 34, 55. In the case of the example illustrated in FIG. 7, the first predetermined number is $F_8$ (=21). In the case of the example illustrated in FIG. 8, the second predetermined number is $F_9$ (=34). That is, the first predetermined number corresponds to one (for example, smaller one) of two different consecutive values in the Fibonacci sequence. The second predetermined number corresponds to the other (for example, larger one) of the two different consecutive values in the Fibonacci sequence. If the arrangement of the apertures 72 illustrated in FIGS. 6 to 8 is mirror-inverted, the magnitude relation between the first predetermined number and the second predetermined number is reversed. As described above, the arrangement of the apertures 72 illustrated in FIG. 6 is the arrangement formed by arranging the first predetermined number of strings of the apertures 72 arranged spirally clockwise in the circumferential direction as illustrated in FIG. 7, and is also the arrangement formed by arranging the second predetermined number of strings of the apertures 72 arranged spirally counterclockwise in the circumferential direction as illustrated in FIG. 8.

FIG. 7 does not illustrate the center point C. This is for avoiding intersection of the line segments T1, T2, . . . , T21 with the leader line for the center point C in FIG. 7. In fact, the center point C is located at the center in the apertures 72 illustrated in FIG. 7 in the same manner as the center point C illustrated in FIG. 6. The same applies to the fact that FIG. 8 does not illustrate the center point C. The specific values of the first predetermined number and the second predetermined number described with reference to FIGS. 7 and 8 are only examples, and are not limited thereto. The combination of the first predetermined number and the second predetermined number need to be a combination of two different consecutive values in the Fibonacci sequence and may be a combination including a smaller value than the above examples or a combination including a larger value than that.

In FIG. 7, the distance between two of the line segments T1, T2, . . . , T21 adjacent in the circumferential direction tends to increase toward the outer circumference. In FIG. 8, the distance between two of the line segments A1, A2, . . . , A34 adjacent in the circumferential direction tends to increase toward the outer circumference. Thus, in the arrangement of the apertures 72 determined based on Expressions (1) to (5) and the predetermined value of "a" given above, the distance between the strings of the spirally arranged apertures 72 tends to increase toward the outer circumference. That is, in such an arrangement, the distance between the apertures 72 adjacent in the circumferential direction tends to increase toward the outer circumference. The distance between the apertures 72 adjacent in the circumferential direction is preferably such that the ratio of the largest distance in the vicinity of the outer circumference to the smallest distance in the vicinity of the central area is equal to or smaller than 1.1.

Figure 9:
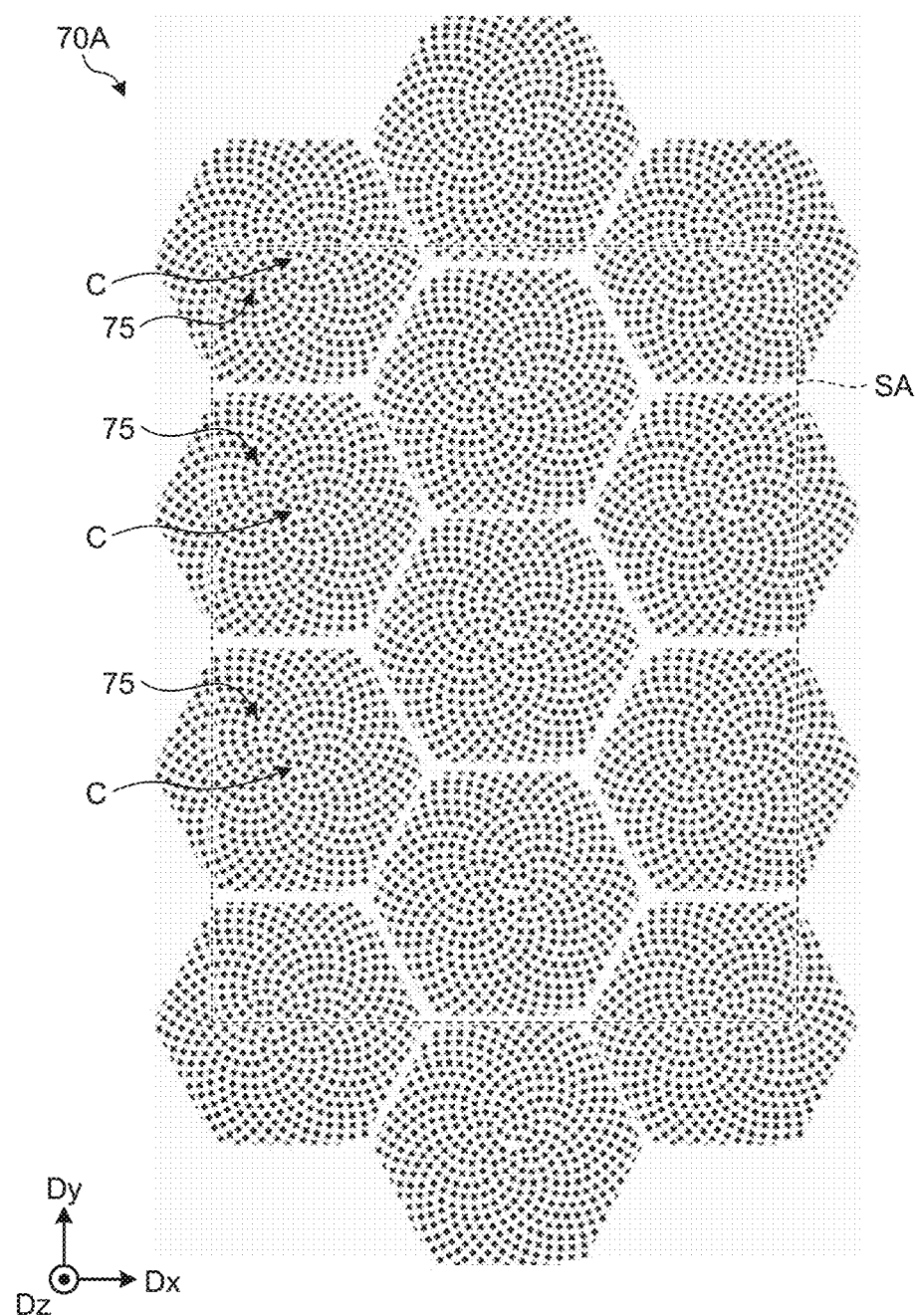
FIG. 9 is a schematic view illustrating an example of an optical filter in which the apertures are arranged in a different manner from the example illustrated in FIG. 5.

FIG. 9 is a schematic view illustrating an example of an optical filter 70A in which the apertures 72 are arranged in a different manner from the example illustrated in FIG. 5. In the embodiment, the optical filter 70A may be provided instead of the optical filter 70. The optical filter 70A has a plurality of partial areas 75. The center point C is individually set for each of the partial areas 75. The apertures 72 are arranged in each of the partial areas 75. The arrangement of the apertures 72 in each of the partial areas 75 includes the arrangement in which the apertures 72 are arranged spirally outward clockwise from the predetermined area including the center point C (refer to FIGS. 6 and 7) and the arrangement in which the apertures 72 are arranged spirally outward counterclockwise from the predetermined area including the center point C (refer to FIGS. 6 and 8).

Specifically, the arrangement of the apertures 72 in each of the partial areas 75 is the same as the arrangement of the apertures 72 in the optical filter 70 described above. That is, the arrangement of the apertures 72 in each of the partial areas 75 is the arrangement of the apertures 72 determined based on Expressions (1) to (5) and the predetermined value of "a" given above.

In FIG. 9, the regular hexagonal partial areas 75 are arranged in a honeycomb shape. Each of the partial areas 75 is obtained by extracting a regular hexagonal area from a circular area in which the partial areas 75 are arranged, as illustrated in FIG. 5. The optical filter 70A is obtained by cutting out the base 73 into a shape corresponding to the detection area SA, the base 73 having the apertures 72 formed therein so as to arrange the regular hexagonal partial areas 75 in a honeycomb shape.

In FIG. 9, in order to clarify the boundary between the adjacent partial areas 75, a blank gap is illustrated at the boundary. However, in reality, the adjacent partial areas 75 are arranged close to each other so as not to form the gap. Arranging the partial areas 75 in the optical filter 70A without a gap in this manner makes it easier to make the ratio of the largest distance in the vicinity of the outer circumference to the smallest distance in the vicinity of the central area (predetermined area including the center point C) closer to 1 in each of the partial areas 75. Thus, the distance between the adjacent partial areas 75 can be easily made more uniform.

The shape of each of the partial areas 75 is not limited to a regular hexagonal shape. The shape may be another shape, such as a square, that can be arranged without gaps.

The following describes operational advantages of the optical filter 70 and the optical filter 70A of the embodiment in comparison with a reference example.

Figures 10, 11:
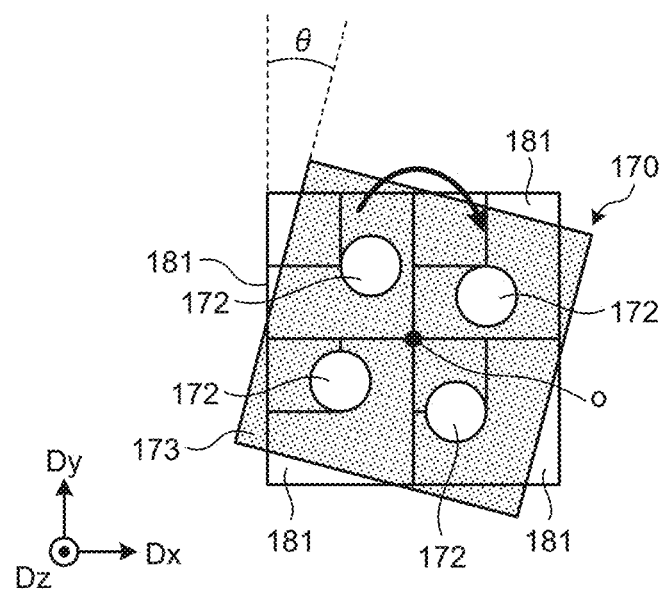
FIG. 10 is a schematic diagram illustrating a relation between an optical filter and the optical sensors according to a reference example.
FIG. 11 is a table illustrating moiré in a detection image that occurs according to the amount of rotation angle for each aperture pitch.

FIG. 10 is a schematic diagram illustrating a relation between an optical filter 170 and partial detection areas 181 according to the reference example. The optical filter 170 according to the reference example is provided with a plurality of apertures 172 in a base 173. The apertures 172 are arranged in a matrix having a row-column configuration. The base 173 has the same configuration as that of the base 73. Each of the apertures 172 is the same as the aperture 72. Each of the partial detection areas 181 is the same as the partial detection area PAA. The partial detection areas 181 are arranged in a matrix having a row-column configuration.

The pitch of the apertures 172 illustrated in FIG. 10 is the same as the predetermined pitch of the photodiodes PD in the partial detection areas 181. Therefore, when the arrangement of the apertures 172 ideally matches with the arrangement of the partial detection areas 181, one of the partial detection areas 181 overlaps one of the apertures 172, and the positional relations between the partial detection areas 181 and the base 173 overlapping each other correspond to each other. In practice, however, a rotation angle θ may be formed between a sensor substrate and the optical filter 170 in the manufacturing process of stacking the sensor substrate provided with the partial detection areas 181 on the optical filter 170. FIG. 10 illustrates the rotation angle θ when the optical filter 170 is rotated such that an error about a rotation axis o occurs in the direction of the matrix-shaped arrangement of the apertures 172 with respect to the direction of the matrix-shaped arrangement of the partial detection areas 181. For example, when the partial detection areas 181 are arranged in a matrix along the first direction Dx and the second direction Dy, the rotation angle θ is made larger than 0 degrees (°) by rotating the optical filter 170 about the rotation axis o such that the arrangement direction of the apertures 172 intersects the first direction Dx and the second direction Dy.

FIG. 11 is a table illustrating moiré in the detection image that occurs according to the amount of rotation angle for each aperture pitch. The aperture pitch in FIG. 11 refers to the pitch of the apertures 172. The rotation angle in FIG. 11 and FIG. 12 described later refers to the rotation angle θ illustrated in FIG. 10.

The rotation angle θ illustrated in FIG. 10 is ideally 0 degrees (°). Therefore, even in the reference example, the moiré hardly occurs in an ideal situation where the aperture pitch is 25 [μm] or 50 [μm] and the rotation angle θ is 0 degrees (°). In the examples illustrated in FIG. 11, moiré-like patterns are generated when the aperture pitch is 30 [μm] or 40 [μm] even when the rotation angle θ is 0 degrees (°). However, these patterns can be regarded as design-assumed patterns generated when the rotation angle θ is 0 degrees (°).

In contrast, when the rotation angle θ is not 0 degrees (°), the moiré occurs that does not occur in the ideal situation described above. FIG. 11 illustrates cases where the rotation angle θ is 15 degrees (°), 30 degrees (°), and 45 degrees (°) as examples of cases where the rotation angle θ is not 0 degrees (°). The moiré occurs in any of these cases. No particular correlation is observed between the magnitude of the rotation angle θ and the noticeability of the moiré, and the moiré is considered to be generated because the rotation angle θ is not 0 degrees (°).

Figure 12:
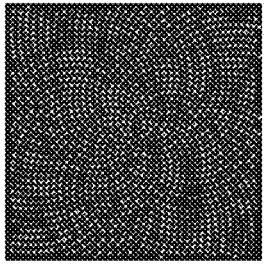
FIG. 12 is a table illustrating examples of light distribution depending on the combination condition of the aperture pitch and the rotation angle compared between the reference example and the embodiment.

FIG. 12 is a table illustrating examples of light distribution depending on the combination condition of the aperture pitch and the rotation angle compared between the reference example and the embodiment. The light distribution is caused by limiting the light transmitted by apertures, such as the apertures 72 of the embodiment or the apertures 172 of the reference example. The effect of the light distribution appears in the detection image. The aperture array of the reference example is arranged in a matrix, for example. The aperture arrangement of the embodiment is, for example, an arrangement in a clockwise and counterclockwise spiral shape. The term "arrangement in a clockwise and counterclockwise spiral shape" refers to the aperture arrangement of the embodiment that corresponds to both the "arrangement of the apertures 72 arranged spirally outward clockwise" described with reference to FIG. 7 and the "arrangement of the apertures 72 arranged spirally outward counterclockwise" described with reference to FIG. 8.

The aperture pitches of the reference example among the aperture pitches in FIG. 12 are aperture pitches of the apertures 172 in the same manner as the aperture pitches in FIG. 11. The aperture pitch of the embodiment refers to the average pitch between the adjacent apertures 72 in the arrangement of the apertures 72. FIG. 12 allows comparison of the case where the rotation angle θ is 0 degrees (°) with the cases where the rotation angle θ is not 0 degrees (°). As the cases where the rotation angle θ is not 0 degrees (°), a case where the rotation angle θ is 3 degrees (°) and a case where the rotation angle θ is 5 degrees (°) are illustrated.

The case where the rotation angle θ is 0 degrees (°) in the embodiment refers to a case where the optical filter 70 ideally overlaps the sensor 80 in the first direction Dx-second direction Dy plan view as intended in the design. The case where the rotation angle θ is not 0 degrees (°) in the embodiment refers to a case where the ideal overlap is not achieved, and at least one of the optical filter 70 and the sensor 80 is disposed so as to be inclined with respect to the first direction Dx and the second direction Dy to cause an angular shift between the optical filter 70 and the sensor 80 in the first direction Dx-second direction Dy plan view. As examples of the magnitude of the angular shift, the case where the rotation angle θ is 3 degrees (°) and the case where the rotation angle θ is 5 degrees (°) are illustrated.

In examples according to the reference example among the examples illustrated in FIG. 12, regular grid patterns are generated when the rotation angle θ is 0 degrees (°) while the regular grid patterns are distorted when the rotation angle θ is not 0 degrees (°). For example, when the aperture pitch is 25 [μm], unintended dark blurring caused by the distortion of the patterns appears in a matrix. When the aperture pitch is 37.5 [μm], unintended patterns appear that are meshed to create gaps due to the distortion of the patterns. When the aperture pitch is 50 [μm], unintended dark grid patterns caused by the distortion of the patterns appear. These distorted patterns appear as moiré in the detection image.

In contrast, in the embodiment, the light distribution hardly changes regardless of whether the rotation angle θ is 0 degrees (°) or not. Therefore, in the embodiment, the moiré is hardly generated by the situation that the rotation angle θ is not 0 degrees (°). Each of the light distributions in the case where the aperture pitch is 25 [μm] among the light distributions of the embodiment illustrated in FIG. 12 is illustrated in a circular area inside an edge portion filled in black. The edge portion is not generated as an actual light distribution.

As described above, the detection device 90 of the embodiment includes optical sensors (photodiodes PD, for example) individually included in the partial detection areas PAA arranged in a matrix and the optical filter 70 provided facing the surface for detecting light with the optical sensors. The optical filter 70 includes the base 73 that does not transmit light and the apertures 72 that are provided in the base 73 and transmit light. The arrangement of the apertures 72 in the base 73 includes the arrangement in which the apertures 72 are arranged spirally outward clockwise from the predetermined area including the predetermined point (for example, the center point C illustrated in FIGS. 4 to 6) (refer to FIG. 7) and the arrangement in which the apertures 72 are arranged spirally outward counterclockwise from the predetermined area including the predetermined point (refer to FIG. 8). With this configuration, the moiré can be restrained from being generated by the situation that the rotation angle θ is not 0 degrees (°). Thus, the unintended moiré can be more reliably reduced.

The pitch (pitch P1) between two apertures 72 located closest to each other among the apertures 72 is preferably equal to or smaller than the pitch between two optical sensors (photodiodes PD, for example) adjacent to each other among the optical sensors. The pitch (pitch P2) between two of the apertures 72 located farthest from each other among the apertures 72 is preferably equal to or smaller than the pitch between two of the optical sensors adjacent to each other. These settings facilitate the arrangement of one or more of the apertures 72 for each of the optical sensors.

The arrangement of the apertures 72 is the arrangement formed by arranging the first predetermined number of strings of the apertures 72 arranged spirally clockwise in the circumferential direction (refer to FIG. 7) and is also the arrangement formed by arranging the second predetermined number of strings of the apertures 72 arranged spirally counterclockwise in the circumferential direction (refer to FIG. 8). The relation between the first predetermined number and the second predetermined number described above is a relation between two different consecutive values in the Fibonacci sequence. Thus, the arrangement of the apertures 72 capable of reliably reducing the unintended moiré can be regularly determined.

The apertures 72 may be configured with the partial areas 75 arranged along the surface for detecting light (refer to FIG. 9). In this case, the arrangement of the apertures 72 in each of the partial areas 75 includes the arrangement in which the apertures 72 are arranged spirally outward clockwise from the predetermined area including the center point C of the partial area 75 and the arrangement in which the apertures 72 are arranged spirally outward counterclockwise from the predetermined area including the center point C. This configuration makes it easier to make the ratio of the largest distance in the vicinity of the outer circumference to the smallest distance in the vicinity of the central area (predetermined area including the center point C) closer to 1 in each of the partial areas 75. Thus, the distance between the adjacent partial areas 75 can be easily made more uniform.

The embodiment of the present disclosure is not limited to that described above. The following describes the modification of the embodiment with reference to FIGS. 13 to 16.

Modification

Figure 13:
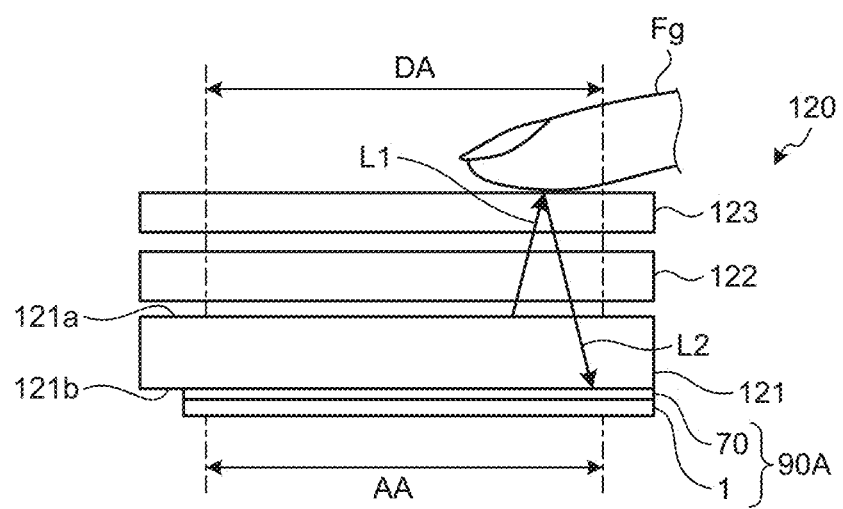
FIG. 13 is a sectional view illustrating a schematic sectional configuration of a display device according to a modification.

FIG. 13 is a sectional view illustrating a schematic sectional configuration of a display device according to the modification. As illustrated in FIG. 13, a display device 120 includes a sensing device 1, a display panel 121, a touch panel 122, and a cover glass 123. The display panel 121 may be, for example, an organic electroluminescent (EL) (organic light-emitting diode (OLED)) display panel or an inorganic EL (micro-LED or mini-LED) display that uses light-emitting elements as display elements. Alternatively, the display panel 121 may be a liquid crystal display (LCD) panel using liquid crystal elements as the display elements or an electrophoretic display (EPD) panel using electrophoretic elements as the display elements. Although an amorphous silicon material is used as photoelectric conversion elements used in the sensing device 1, an organic material, for example, may be used instead.

The display panel 121 has a first principal surface 121a and a second principal surface 121b opposite to the first principal surface 121a. The first principal surface 121a is a surface that emits the light L1 from the display elements toward the cover glass 123 to display an image. The first principal surface 121a has a display area DA in which the image is displayed.

The touch panel 122 uses, for example, a capacitance method to detect the finger Fg in contact with or in proximity to a surface of the cover glass 123. The touch panel 122 is transmissive of light, and can transmit the light L1 and the light L2 that has been reflected on an interface between the cover glass 123 and air. The display device 120 may have a configuration not including the touch panel 122. The display panel 121 may be integrated with the touch panel 122, or may incorporate that function of the touch panel 122.

The cover glass 123 is a member for protecting, for example, the display panel 121, and covers, for example, the display panel 121. The cover glass 123 is, for example, a glass substrate. The present disclosure is not limited to using the cover glass 123. For example, a resin substrate may be provided above the touch panel 122.

The sensing device 1 is provided so as to face the second principal surface 121b of the display panel 121. The sensing device 1 can detect asperities on a surface of the finger Fg by detecting the light L2 reflected on the interface between the cover glass 123 and air. Since the area of the sensing device 1 can be easily increased, a detection area AA of the sensing device 1 is provided so as to face the entire display area DA of the display panel 121. The detection area AA is not limited to this configuration, and may face part of the display area DA of the display panel 121.

Figure 14:
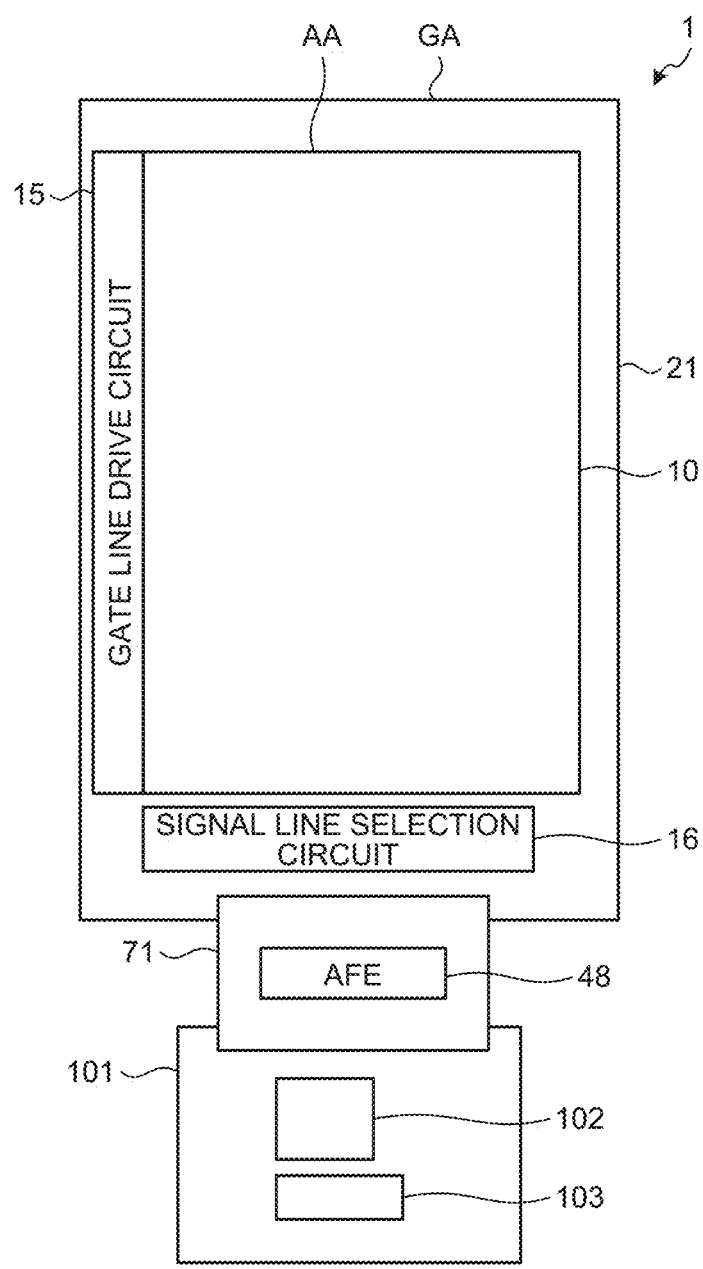
FIG. 14 is a plan view illustrating a detection device according to the modification.
Figure 15:
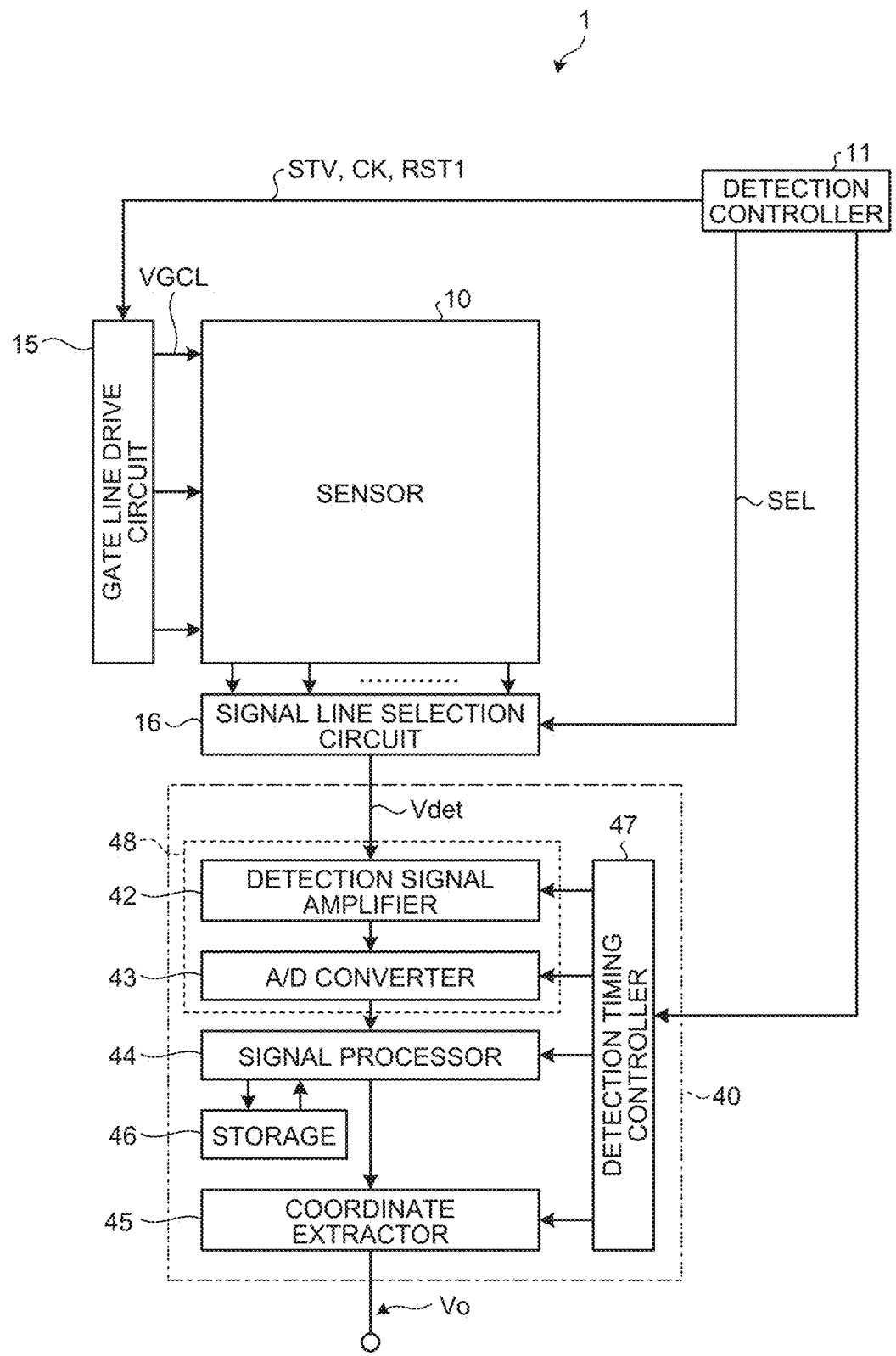
FIG. 15 is a block diagram illustrating a configuration example of the detection device according to the modification.

FIG. 14 is a plan view illustrating a detection device according to the modification. FIG. 15 is a block diagram illustrating a configuration example of the detection device according to the modification. As illustrated in FIG. 14, the sensing device 1 includes an insulating substrate 21, a sensor 10, the gate line drive circuit 15, a signal line selection circuit 16, an analog front-end circuit (hereinafter, referred to as AFE) 48, a control circuit 102, and the power supply circuit 103.

As illustrated in FIG. 14, the insulating substrate 21 is electrically coupled to a control substrate 101 through a flexible printed circuit board 71. The flexible printed circuit board 71 is provided with the AFE 48. The control substrate 101 is provided with the control circuit 102 and the power supply circuit 103. The control circuit 102 is, for example, a field-programmable gate array (FPGA). The control circuit 102 supplies control signals to the sensor 10, the gate line drive circuit 15, and the signal line selection circuit 16 to control a detection operation of the sensor 10. The power supply circuit 103 supplies voltage signals including, for example, the power supply signal (Voltage) SVS (refer to FIG. 3) to the sensor 10 and the gate line drive circuit 15.

As illustrated in FIG. 14, the insulating substrate 21 has the detection area AA and a peripheral area GA. The detection area AA is an area overlapping the photodiodes PD (refer to FIG. 3) included in the sensor 10. The peripheral area GA is an area outside the detection area AA, and is an area not overlapping the photodiodes PD. That is, the peripheral area GA is an area between the outer perimeter of the detection area AA and the ends of the insulating substrate 21. The gate line drive circuit 15 and the signal line selection circuit 16 are provided in the peripheral area GA.

As illustrated in FIG. 15, the sensing device 1 further includes a detection controller (detection control circuit) 11 and the detector 40. The control circuit 102 includes one, some, or all functions of the detection controller 11. The control circuit 102 also includes one, some, or all functions of the detector 40 except those of the AFE 48.

The sensor 10 is an optical sensor including the photodiodes PD serving as the photoelectric conversion elements. Each of the photodiodes PD included in the sensor 10 outputs an electrical signal corresponding to light irradiating the photodiode PD as a detection signal Vdet to the signal line selection circuit 16. The sensor 10 performs the detection in response to the drive signal supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal SEL to the signal line selection circuit 16.

The gate line drive circuit 15 is a circuit that drives the gate lines GCL (refer to FIG. 16) based on the various control signals. The gate line drive circuit 15 sequentially or simultaneously selects the gate lines GCL, and supplies the drive signals to the selected gate lines GCL. Through this operation, the gate line drive circuit 15 selects the photodiodes PD coupled to the gate lines GCL.

The signal line selection circuit 16 is a switch circuit that sequentially or simultaneously selects the signal lines SGL (refer to FIG. 16). The signal line selection circuit 16 couples the selected signal lines SGL to the AFE 48 based on the selection signal SEL supplied from the detection controller 11. Through this operation, the signal line selection circuit 16 outputs the detection signals Vdet of the photodiodes PD to the detector 40. The signal line selection circuit 16 is, for example, a multiplexer.

The detector (detection circuit) 40 includes the AFE 48, a signal processor (signal processing circuit) 44, a coordinate extractor (coordinate extraction circuit) 45, a storage (storage circuit) 46, and a detection timing controller (detection timing control circuit) 47. Based on a control signal supplied from the detection controller 11, the detection timing controller 47 controls the AFE 48, the signal processor 44, and the coordinate extractor 45 so as to operate in synchronization with one another.

The AFE 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor 10 based on an output signal of the AFE 48. When the finger is in contact with or in proximity to the detection surface, the signal processor 44 can detect the asperities on the surface of the finger or a palm based on the signal from the AFE 48.

The storage 46 temporarily stores therein a signal calculated by the signal processor 44. The storage 46 may be, for example, a random-access memory (RAM) or a register circuit.

The coordinate extractor 45 is a logic circuit that obtains detected coordinates of the asperities on the surface of the finger or the like when the contact or the proximity of the finger is detected by the signal processor 44. The coordinate extractor 45 combines the detection signals Vdet output from the respective photodiodes PD of the sensor 10 to generate two-dimensional information representing the shape of the asperities on the surface of the finger or the like. The coordinate extractor 45 may output the detection signals Vdet as sensor outputs Vo instead of calculating the detected coordinates.

The following describes a specific circuit configuration example of the sensing device 1. FIG. 16 is a circuit diagram illustrating the detection device according to the modification.

As illustrated in FIG. 16, the sensor 10 has the partial detection areas PAA arranged in a matrix. Each of the partial detection areas PAA is the same as that described with reference to FIG. 3 and therefore, will not be described in detail. In the modification, the power supply signal (voltage) SVS and the reference signal (voltage) VR1 are supplied from the power supply circuit 103.

As illustrated in FIG. 16, the gate line GCL extends in the first direction Dx and is coupled to the partial detection areas PAA arranged in the first direction Dx. A plurality of gate lines GCL1, GCL2, . . . , GCL8 are arranged in the second direction Dy, and are each coupled to the gate line drive circuit 15. In the following description, the gate lines GCL1, GCL2, . . . , GCL8 will each be simply referred to as the gate line GCL when they need not be distinguished from one another. Although the number of the gate lines GCL is eight, this is merely an example. Eight or more, such as 256, of the gate lines GCL may be arranged.

The signal line SGL is coupled to the AFE 48 through the signal line selection circuit 16. The signal line SGL extends in the second direction Dy and is coupled to the partial detection areas PAA arranged in the second direction Dy. A plurality of signal lines SGL1, SGL2, . . . , SGL12 are arranged in the first direction Dx and are each coupled to the signal line selection circuit 16 and a reset circuit 17. Although the number of the signal lines SGL is twelve, this is merely an example. Twelve or more, such as 252, of the signal lines SGL may be arranged. In FIG. 16, the sensor 10 is provided between the signal line selection circuit 16 and the reset circuit 17. The present disclosure is not limited thereto. The signal line selection circuit 16 and the reset circuit 17 may be coupled to ends of the signal lines SGL in the same direction.

The gate line drive circuit 15 receives the various control signals such as the start signal STV, the clock signal CK, and the reset signal RST through a level shifter 151. The gate line drive circuit 15 includes a plurality of switching elements (not illustrated). The gate line drive circuit 15 operates the switching elements to sequentially select the gate lines GCL1, GCL2, . . . , GCL8 in a time-division manner. The gate line drive circuit 15 supplies the drive signal to the switching elements Tr through the selected gate line GCL. This operation selects the partial detection areas PAA arranged in the first direction Dx as detection targets.

The signal line selection circuit 16 includes a plurality of selection signal lines Lsel, a plurality of output signal lines (for example, output signal lines Lout1 and Lout2), and switching elements TrS. The switching elements TrS are provided correspondingly to the respective signal lines SGL. Six of the signal lines SGL1, SGL2, . . . , SGL6 are coupled to the common output signal line Lout1. Six of the signal lines SGL7, SGL8, . . . , SGL12 are coupled to the common output signal line Lout2. The output signal lines Lout1 and Lout2 are each coupled to the AFE 48. The term "selection signal lines Lsel" is a comprehensive term for the selection signal lines Lsel1, Lsel2, . . . , Lsel6 illustrated in FIG. 16.

The signal lines SGL1, SGL2, . . . , SGL6 are grouped into a first signal line block, and the signal lines SGL7, SGL8, . . . , SGL12 are grouped into a second signal line block. Each of the selection signal lines Lsel is coupled to the gate of a corresponding one of the switching elements TrS included in one of the signal line blocks. One of the selection signal lines Lsel is coupled to the gates of the switching elements TrS in the signal line blocks. Specifically, the selection signal lines Lsel1, Lsel2, . . . , Lsel6 are respectively coupled to the switching elements TrS corresponding to the signal lines SGL1, SGL2, . . . , SGL6. The selection signal line Lsel1 is coupled to the switching element TrS corresponding to the signal line SGL1 and the switching element TrS corresponding to the signal line SGL7. The selection signal line Lsel2 is coupled to the switching element TrS corresponding to the signal line SGL2 and the switching element TrS corresponding to the signal line SGL8.

The control circuit 102 (refer to FIG. 14) sequentially supplies the selection signals to the selection signal lines Lsel through level shifters 161. FIG. 16 illustrates a selection signal SEL1 supplied to the selection signal line Lsel1, a selection signal SEL2 supplied to the selection signal line Lsel2, . . . , a selection signal SEL6 supplied to the selection signal line Lsel6 as the selection signals. This operation causes the signal line selection circuit 16 to operate the switching elements TrS to sequentially select each of the signal lines SGL in each of the signal line blocks in a time-division manner. The signal line selection circuit 16 simultaneously selects one of the signal lines SGL in the signal line blocks. With the above-described configuration, the sensing device 1 can reduce the number of integrated circuits (ICs) including the AFE 48 or the number of terminals of the ICs.

As illustrated in FIG. 16, the reset circuit 17 includes a reference signal line Lvr, a reset signal line Lrst, and switching elements TrR. The switching elements TrR are provided corresponding to the signal lines SGL. The reference signal line Lvr is coupled to either the sources or the drains of the switching elements TrR. The reset signal line Lrst is coupled to the gates of the switching elements TrR.

The control circuit 102 supplies a reset signal RST2 to the reset signal line Lrst through a level shifter 171. This operation turns on the switching elements TrR to electrically couple the signal lines SGL to the reference signal line Lvr. The power supply circuit 103 supplies the reference signal VR1 to the reference signal line Lvr. This operation supplies the reference signal VR1 to the capacitive elements Ca included in the partial detection areas PAA.

The power supply circuit 103 supplies a predetermined power supply signal to the cathodes of the photodiodes PD. The control circuit 102 supplies the reference signal VR1 and the reset signal RST2 serving as high-level voltage signals to the reset circuit 17 before a reset period starts. The control circuit 102 supplies the start signal STV to the gate line drive circuit 15 to start the reset period.

During the reset period, a shift register included in the gate line drive circuit 15 sequentially selects the gate line GCL based on the start signal STV, the clock signal CK, and the reset signal RST1. The gate line drive circuit 15 sequentially supplies the drive signal to each of the gate lines GCL. The drive signal has a pulsed waveform including a high-level voltage and a low-level voltage.

During the reset period, the capacitive elements Ca of all the partial detection areas PAA are sequentially electrically coupled to the signal lines SGL and are supplied with the reference signal VR1. As a result, the capacitance of the capacitive elements Ca is reset.

After the final drive signal among drive signals that are sequentially supplied is supplied to the gate line GCL corresponding to the final drive signal, an exposure period starts in the partial detection areas PAA. The start timing and the end timing of the exposure period for the partial detection areas PAA corresponding to each of the gate lines GCL are different between the shared gate lines GCL. The exposure period starts, for example, when the drive signal changes from the high-level voltage to the low-level voltage. The exposure period ends when the drive signal changes from the low-level voltage to the high-level voltage. The lengths of the exposure period for the partial detection areas PAA are equal to each other.

During the exposure period, a current flows correspondingly to the light irradiating the photodiode PD in each of the partial detection areas PAA. As a result, an electric charge is stored in each of the capacitive elements Ca.

At a time before the start of a read period of each of the capacitive elements Ca, the control circuit 102 provides the reset period to stop the operation of the reset circuit 17. During the read period, the gate line drive circuit 15 sequentially supplies the drive signal to each of the gate lines GCL.

During the read period, the control circuit 102 sequentially supplies the selection signals SEL1, . . . , SEL6 to the signal line selection circuit 16. This operation sequentially or simultaneously couples the signal lines SGL of the partial detection areas PAA selected by the drive signals to the AFE 48. As a result, the detection signals Vdet are supplied to the AFE 48. In the same manner, the signal line selection circuit 16 sequentially selects the signal line SGL in each period in which a corresponding one of the drive signals is set to a high-level voltage VGH. Thus, the sensing device 1 can output the detection signals Vdet of all the partial detection areas PAA to the AFE 48 during the read period.

The sensing device 1 may perform the fingerprint detection by repeatedly executing the reset period, the exposure period, and the read period. Alternatively, the sensing device 1 may start the detection operation when having detected that the finger or the like is in contact with or in proximity to the detection surface.

The same component as the optical filter 70 of the embodiment is provided between the display panel 121 and the sensing device 1. That is, a detection device 90A of the modification includes the optical filter 70 and the sensing device 1. The optical filter 70 may be replaced with the optical filter 70A. While the above has described the sensing device 1 of the modification, the sensor 80 of the embodiment may be the sensing device 1 of the modification. In that case, the specific configuration of the sensor 80 described with reference to FIGS. 2 and 3 is replaced by the sensing device 1 of the modification.

Also, in the modification, the same component as the infrared cutoff filter 62 of the embodiment may be provided between the display panel 121 and the optical filter 70. In other words, the infrared cutoff filter 62 is not essential in the embodiment and the modification.

The above description illustrates the example in which a display panel such as the display part 61 in the embodiment or the display panel 121 in the modification is provided, and the display panel is used as a light source of the light detected by the optical sensor of the detection device. However, the specific configuration of the detection device is not limited to this example. The detection device need not include a display panel. That is, a dedicated light source not supposed to display an image may be provided to emit light for detection, or the light source may be omitted, supposing to use outside light.

Other operational advantages accruing from the aspects described in the embodiment and the modification that are obvious from the description herein, or that are conceivable as appropriate by those skilled in the art will naturally be understood as accruing from the present invention.

What is claimed is:

1. A detection device comprising:
   a plurality of optical sensors arranged in a matrix having a row-column configuration; and
   an optical filter provided facing a surface for detecting light with the optical sensors, wherein
   the optical filter that is a collimator comprises
      a base configured not to transmit light and
      a plurality of apertures provided in the base and configured to transmit light,
   an arrangement of the apertures in the base comprises an arrangement in which the apertures are arranged spirally outward clockwise from a predetermined area and an arrangement in which the apertures are arranged spirally outward counterclockwise from the predetermined area, and
   the predetermined area includes a predetermined point.

2. The detection device according to claim 1, wherein
   an arrangement of the apertures is an arrangement formed by arranging a first predetermined number of strings of the apertures arranged spirally clockwise in a circumferential direction and is also an arrangement formed by arranging a second predetermined number of strings of the apertures arranged spirally counterclockwise in the circumferential direction, and a relation between the first predetermined number and the second predetermined number is a relation between two different consecutive values in the Fibonacci sequence.

3. The detection device according to claim 1, wherein
the optical filter has a plurality of partial areas arranged along the surface for detecting light, and
an arrangement of the apertures in one of the partial areas comprises an arrangement in which the apertures are arranged spirally outward clockwise from an area including a center point of the one of the partial areas and an arrangement in which the apertures are arranged spirally outward counterclockwise from the area including the center point.

4. A display device comprising:
the detection device according to claim 1; and
a display panel disposed on a detection surface side of the detection device.

5. The detection device according to claim 1, wherein the optical filter as a whole has a shape of a quadrangle.

6. The detection device according to claim 1, wherein the collimator as a whole has a shape of a quadrangle.

7. A detection device comprising:
a plurality of optical sensors arranged in a matrix having a row-column configuration; and
an optical filter provided facing a surface for detecting light with the optical sensors, wherein
the optical filter comprises
a base configured not to transmit light and
a plurality of apertures provided in the base and configured to transmit light,
an arrangement of the apertures in the base comprises an arrangement in which the apertures are arranged spirally outward clockwise from a predetermined area and an arrangement in which the apertures are arranged spirally outward counterclockwise from the predetermined area,
the predetermined area includes a predetermined point, and
a pitch between two apertures located closest to each other among the apertures is smaller than a pitch between two optical sensors adjacent to each other among the optical sensors.

8. The detection device according to claim 7, wherein
an arrangement of the apertures is an arrangement formed by arranging a first predetermined number of strings of the apertures arranged spirally clockwise in a circumferential direction and is also an arrangement formed by arranging a second predetermined number of strings of the apertures arranged spirally counterclockwise in the circumferential direction, and
a relation between the first predetermined number and the second predetermined number is a relation between two different consecutive values in the Fibonacci sequence.

9. The detection device according to claim 7, wherein
the optical filter has a plurality of partial areas arranged along the surface for detecting light, and
an arrangement of the apertures in one of the partial areas comprises
an arrangement in which the apertures are arranged spirally outward clockwise from an area including a center point of the one of the partial areas and
an arrangement in which the apertures are arranged spirally outward counterclockwise from the area including the center point.

10. A display device comprising:
the detection device according to claim 7; and
a display panel disposed on a detection surface side of the detection device.

11. A detection device comprising:
a plurality of optical sensors arranged in a matrix having a row-column configuration; and
an optical filter provided facing a surface for detecting light with the optical sensors, wherein
the optical filter comprises
a base configured not to transmit light and
a plurality of apertures provided in the base and configured to transmit light,
an arrangement of the apertures in the base comprises an arrangement in which the apertures are arranged spirally outward clockwise from a predetermined area and an arrangement in which the apertures are arranged spirally outward counterclockwise from the predetermined area,
the predetermined area includes a predetermined point, and
a pitch between two apertures located farthest from each other among the apertures is smaller than a pitch between two optical sensors adjacent to each other among the optical sensors.

12. The detection device according to claim 11, wherein
an arrangement of the apertures is an arrangement formed by arranging a first predetermined number of strings of the apertures arranged spirally clockwise in a circumferential direction and is also an arrangement formed by arranging a second predetermined number of strings of the apertures arranged spirally counterclockwise in the circumferential direction, and
a relation between the first predetermined number and the second predetermined number is a relation between two different consecutive values in the Fibonacci sequence.

13. The detection device according to claim 11, wherein
the optical filter has a plurality of partial areas arranged along the surface for detecting light, and
an arrangement of the apertures in one of the partial areas comprises
an arrangement in which the apertures are arranged spirally outward clockwise from an area including a center point of the one of the partial areas and
an arrangement in which the apertures are arranged spirally outward counterclockwise from the area including the center point.

14. A display device comprising:
the detection device according to claim 11; and
a display panel disposed on a detection surface side of the detection device.

* * * * *